United States Patent
Koeppe et al.

(10) Patent No.: US 10,923,919 B2
(45) Date of Patent: Feb. 16, 2021

(54) METHOD AND APPARATUS FOR CONTROLLING POWER FLOW IN A HYBRID POWER SYSTEM

(71) Applicant: Faith Technologies, Inc., Menasha, WI (US)

(72) Inventors: Jim Koeppe, Middleton, WI (US); Joel L. Haynie, Deforest, WI (US); Kevin Dennis, Waukesha, WI (US)

( * ) Notice: Subject to any disclaimer, the term of this patent is extended or adjusted under 35 U.S.C. 154(b) by 0 days.

(21) Appl. No.: 16/567,140

(22) Filed: Sep. 11, 2019

(65) Prior Publication Data
US 2020/0006947 A1  Jan. 2, 2020

Related U.S. Application Data

(63) Continuation of application No. 15/616,519, filed on Jun. 7, 2017, now Pat. No. 10,454,277.

(60) Provisional application No. 62/347,210, filed on Jun. 8, 2016.

(51) Int. Cl.
| | |
|---|---|
| *H02J 3/46* | (2006.01) |
| *H02J 13/00* | (2006.01) |
| *H02J 3/38* | (2006.01) |
| *H02J 3/32* | (2006.01) |

(52) U.S. Cl.
CPC ............ *H02J 3/46* (2013.01); *H02J 3/32* (2013.01); *H02J 3/381* (2013.01); *H02J 3/383* (2013.01); *H02J 3/386* (2013.01); *H02J 13/0086* (2013.01); *H02J 13/0096* (2013.01); *Y02B 90/20* (2013.01); *Y02E 10/56* (2013.01); *Y02E 10/76* (2013.01); *Y02E 40/70* (2013.01); *Y02E 70/30* (2013.01); *Y04S 10/12* (2013.01); *Y04S 10/123* (2013.01); *Y04S 20/12* (2013.01)

(58) Field of Classification Search
CPC ...... H02J 3/46; H02J 3/32; H02J 3/381; H02J 3/383; H02J 3/386; H02J 13/0086; H02J 13/0096; Y02B 90/12; Y02E 10/76; Y02E 40/70; Y02E 70/30; Y04S 10/12; Y04S 10/123
See application file for complete search history.

(56) References Cited

U.S. PATENT DOCUMENTS

2013/0147272 A1*  6/2013  Johnson ............... H02J 7/34
                                                    307/29

* cited by examiner

*Primary Examiner* — Robert L Deberadinis
(74) *Attorney, Agent, or Firm* — Randall W. Fieldhack

(57) ABSTRACT

A power control system for managing energy transfer includes a shared electrical bus including an electrical energy generating source, an electrical energy storage device, and an electrical load, each connected to the shared electrical bus; and a controller operable to execute a plurality of instructions stored in a non-transitory memory on the controller to: receive a command corresponding to a desired operation of the power control system, generate a plurality of control commands as a function of a signal received from at least one sensor, and generate a log storing the present operating state for each of the electrical energy generating source, the electrical energy storage device, and the electrical load over a predefined duration, and wherein the at least one input corresponding to the past operating state of the power control system is the log.

20 Claims, 8 Drawing Sheets

METHOD AND APPARATUS FOR CONTROLLING POWER FLOW IN A HYBRID POWER SYSTEM

CROSS-REFERENCE TO RELATED APPLICATIONS

This application is a continuation of U.S. patent application Ser. No. 15/616,519 titled Method and Apparatus for Controlling Power Flow in a Hybrid Power System, where this application and U.S. patent application Ser. No. 15/616,519 both claim priority to U.S. Provisional Application Ser. No. 62/347,210, filed Jun. 8, 2016; the entire contents of these are incorporated herein by reference.

BACKGROUND

The invention relates to a method and apparatus of controlling a hybrid power system. Specifically, this invention manages energy transfer and power flow among one or more power generating sources, storage devices, loads, the utility grid, an off-grid power system, or a combination thereof, each of which is coupled to a common electrical bus.

In recent years, increased demands for energy and increased concerns about supplies of fossil fuels and their corresponding pollution have led to an increased interest in renewable energy sources. Two of the most common and best developed renewable energy sources are photo voltaic energy and wind energy. Other renewable energy sources may include fuel cells, hydroelectric energy, tidal energy, and biofuel or biomass generators. However, using renewable energy sources to generate electrical energy presents a new set of challenges.

One challenge for connecting renewable energy sources to existing AC grids, whether the utility grid or an off-grid system, is that renewable energy sources often provide a variable supply of energy. The supply may vary, for example, according to the amount of wind, cloud cover, or time of day. Further, different energy sources provide different types of electrical energy. A wind turbine, for example, is better suited to provide Alternating Current (AC) energy with variable voltage and frequency while a photovoltaic cell is better suited to provide Direct Current (DC) energy. As a result, combining multiple sources of renewable energy with other generating systems, such as the utility grid, independent micro turbines and generators, or fuel cells into a single system with an AC and/or a DC output requires integration of each of these different energy sources.

The variable nature of the energy supplied by some renewable sources may also make it desirable to integrate an energy storage device in the power system. The energy storage device may be charged during periods of peak production by the renewable source or, alternately, by the utility grid or other generating source. The energy storage device may then deliver the stored energy to supplement the renewable source when the renewable source is generating less energy than is required by the loads in a system.

In addition to challenges connecting the renewable energy sources to the electrical grids, the growth in the number of renewable energy sources presents challenges for the electrical grids themselves. The variable nature of the energy supplied may result in a significant fluctuation in demand, requiring the utility to supply additional energy when generation by the renewable energy sources is low or to absorb excess energy when generation by the renewable energy sources is high. The utility grid must be configured to maintain a balanced load for all electricity consumers without having the ability to control the renewable energy source.

Thus, it would be desirable to provide a system by which a provider of an electrical grid may have access to control renewable energy assets.

Another challenge facing owners of renewable energy sources is the ability to achieve the most economical generation of energy to supply their needs. For example, an owner of a wind turbine may realize more generation capacity during some evenings if the average wind speed increases. However, the utility grid may charge more for energy provided during the day and less for energy provided during the evening. Therefore, it may be desirable to store energy generated by the wind turbine during the evening for use during the following day and thereby utilize energy from the utility grid at the lower rate and utilize energy generated from the wind turbine during periods when the utility grid charges higher rates.

Thus, it would be desirable to provide a system by which an owner of renewable energy assets may control utilization of energy assets to reduce overall energy expense.

SUMMARY

Consistent with the foregoing and in accordance with the invention as embodied and broadly described herein, a method and apparatus for controlling power flow and energy transfer in a hybrid power system is described in suitable detail to enable one of ordinary skill in the art to make and use the invention.

The present invention provides a system by which a provider of an electrical grid may have access to control renewable energy assets.

The present invention further provides a system by which an owner of renewable energy assets may control utilization of energy assets to reduce overall energy expense.

A system and method for controlling power flow in a hybrid power system includes a controller in communication with the hybrid power system. The controller may also be in communication with at least one knowledge system to receive information related to power generation or power consumption within the hybrid power system. The controller generates a control command for each of the power converters in the hybrid power system and maintains a log of power flow to and from each device in the hybrid power system. The controller is also in communication with a provider of the utility grid and may generate the control commands for each of the power converters in response to commands provided from the provider of the utility grid.

According to one embodiment of the invention, a power control system for managing energy transfer includes a shared electrical bus including an electrical energy generating source, an electrical energy storage device, and an electrical load, each connected to the shared electrical bus; and a controller operable to execute a plurality of instructions stored in a non-transitory memory on the controller to: receive a command corresponding to a desired operation of the power control system, receive at least one input corresponding to one of a past operating state and a future operating state of the power control system, and generate a plurality of control commands, wherein each of the plurality of control commands corresponds to one of the electrical energy generating source, the electrical energy storage device, and the electrical load, and wherein each of the plurality of control commands is generated as a function of the command and of the at least one input. The controller is also operable to transmit each of the plurality of control commands to the corresponding electrical energy generating source, electrical energy storage device, or electrical load to manage energy transfer between the electrical energy generating source, the electrical energy storage device, and the electrical load. The power control system further includes at least one sensor providing a signal to the controller corresponding to one of a voltage, a current, and a level of energy transfer between the shared electrical bus and one of the electrical energy generating source, the electrical energy storage device, and the electrical load, wherein the controller further generates the plurality of control commands as a function of the signal received from the at least one sensor and wherein the controller is further operable to generate a log storing the present operating state for each of the electrical energy generating source, the electrical energy storage device, and the electrical load over a predefined duration, and wherein the at least one input corresponding to the past operating state of the power control system is the log.

According to another aspect of the invention, a power control system for managing energy transfer includes a shared electrical bus including an electrical energy generating source, an electrical energy storage device, and an electrical load, each connected to the shared electrical bus; and a controller operable to execute a plurality of instructions stored in a non-transitory memory on the controller to: receive a command corresponding to a desired operation of the power control system, receive at least one input corresponding to one of a past operating state and a future operating state of the power control system, and generate a plurality of control commands, wherein each of the plurality of control commands corresponds to one of the electrical energy generating source, the electrical energy storage device, and the electrical load, and wherein each of the plurality of control commands is generated as a function of the command and of the at least one input. The controller is also operable to transmit each of the plurality of control commands to the corresponding electrical energy generating source, electrical energy storage device, or electrical load to manage energy transfer between the electrical energy generating source, the electrical energy storage device, and the electrical load. The power control system further includes at least one knowledge system in communication with the controller, wherein the knowledge system transmits the at least one input to the controller.

According to yet another aspect of the invention, a power control system for managing energy transfer includes a shared electrical bus including a first electrical energy generating source, a first electrical energy storage device, and a first electrical load each connected to the shared electrical bus; and a a first controller operable to execute a plurality of instructions stored in a first non-transitory memory on the first controller to: receive a first command corresponding to a desired operation of a first portion of the power control system, receive at least one first input corresponding to one of a past operating state and a future operating state of the first portion of the power control system, generate a plurality of first control commands, wherein each of the plurality of first control commands corresponds to one of the first electrical energy generating source, the first electrical energy storage device, and the first electrical load, and wherein each of the plurality of first control commands is generated as a function of the first command and of the at least one first input, and transmit each of the plurality of first control commands to the corresponding first electrical energy generating source, first electrical energy storage device, or first electrical load to manage energy transfer between the first electrical energy generating source, the first electrical energy storage device, and the first electrical load. The power control system further includes at least one first sensor providing a signal to the first controller corresponding to one of a voltage, a current, and a level of energy transfer between the shared electrical bus and one of the first electrical energy generating source, the first electrical energy storage device, and the first electrical load, wherein the first controller further generates the plurality of first control commands as a function of the signal received from the at least one first sensor and wherein the first controller is further operable to generate a first log storing the present operating state for each of the first electrical energy generating source, the first electrical energy storage device, and the first electrical load over a predefined duration, and wherein the at least one first input corresponding to the past operating state of the power control system is the log. The power control system also includes a second electrical bus connected to the shared electrical bus, the second electrical bus including connected to the second electrical bus at least one of a second electrical energy generation source, a second electrical energy storage device, and a second electrical load connected to the second electrical bus; and a second controller configured to generate a plurality of second control commands, wherein each of the plurality of second control commands corresponds to one of the second electrical energy generation source, the second electrical energy storage device, and the second electrical load, wherein the second controller is operable to execute a plurality of instructions stored in a second non-transitory memory to: receive a second command corresponding to a desired operation of a second portion of the power control system, receive at least one second input corresponding to one of a past operating state and a future operating state of the second portion of the power control system, generate the plurality of second control commands as a function of the second command and of the at least one second input, and transmit each of the plurality of second control commands to the corresponding second electrical energy generation source, second electrical energy storage device, and second electrical load to manage energy transfer therebetween. The power control system further includes at least one knowledge system in communication with the first or second controller, wherein the knowledge system transmits the at least one first input or the at least one second input to the first or second controller.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
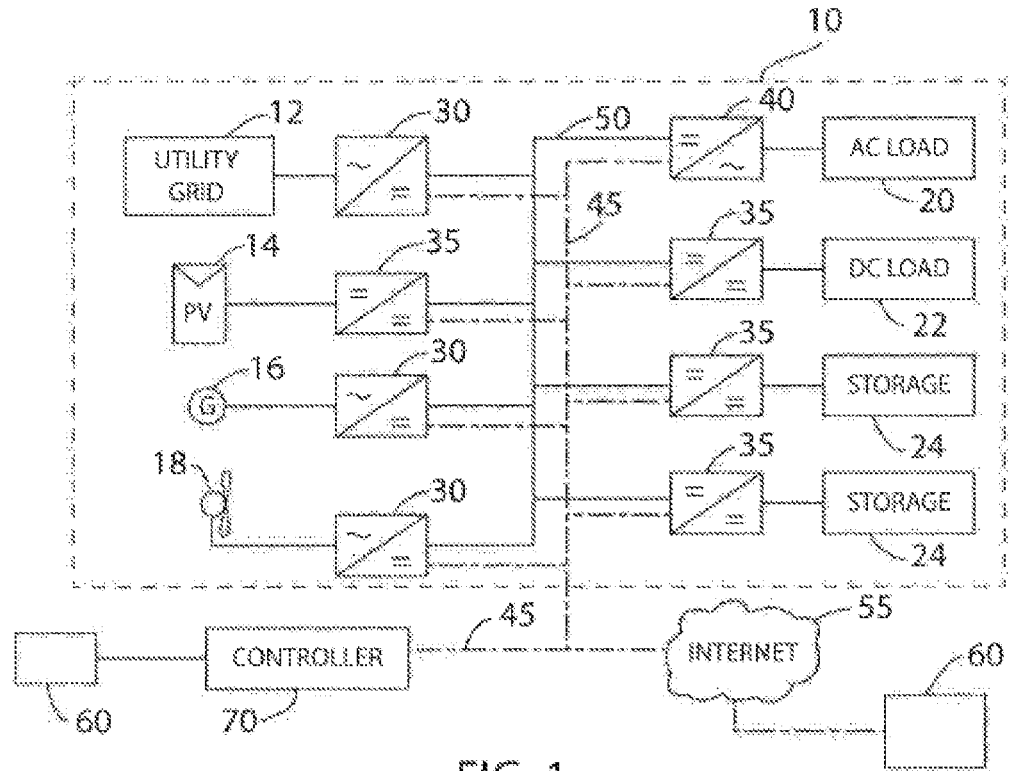
FIG. 1 is a block diagram representation of a controller and hybrid power system according to one embodiment of the invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The present invention provides a method and apparatus of controlling power flow and energy transfer in a hybrid power system 10. Specifically, this invention manages power flow or energy transfer among one or more power generating sources, storage devices, loads, and the utility grid, each of which is coupled to a common electrical bus, either directly or by a power conversion device.

Figure 5:
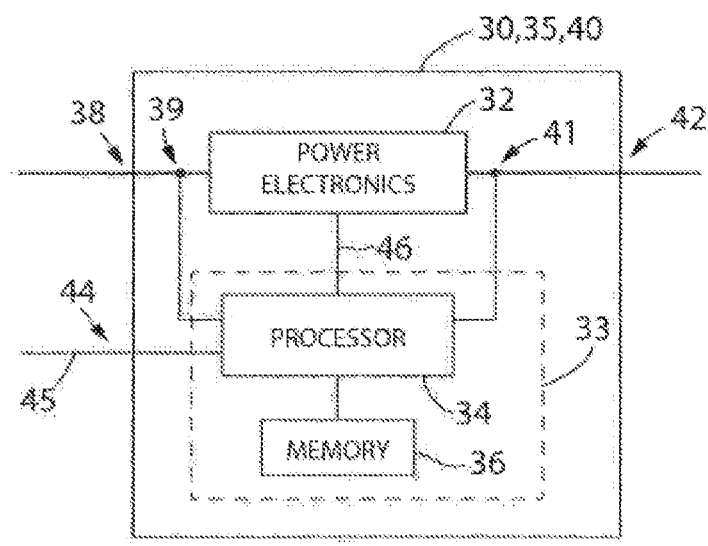
FIG. 5 is a block diagram representation of power conversion devices incorporated within the hybrid power system of FIG. 1.

Throughout this description, several terms will be used for describing the power conversion devices used to couple a generating source or load to a common electrical bus. With reference to FIG. 1, power conversion devices coupling the sources and loads to a common DC bus 50 include: a converter 30, a regulator 35, and an inverter 40. The converter 30 refers to a power conversion device which converts an alternating current (AC) input to a DC output. The regulator 35 refers to a power conversion device which converts a DC input at a first voltage potential to a DC output at a second voltage potential. The inverter 40 refers to a power conversion device which converts a DC input to an AC output. Referring also to FIG. 5, each of the power conversion devices includes similar fundamental components. The converter 30, regulator 35, and inverter 40 include a power electronics section 32 configured to convert the voltage and/or current present at the input 38 to a different voltage and/or current present at the output 42. The power electronics section 32 includes multiple power electronic devices, such as transistors, silicon-controlled rectifiers (SCRs), thyristors, and the like which are controlled by switching signals 46 to selectively conduct the voltage and/or current between the input 38 and the output 42 of the power conversion device.

One or more sensors 39 may be provided at the input 38 to measure a current and/or voltage level at the input 38 and provide signals to a control unit 33. One or more sensors 41 may be provided at the output 42 to measure a current and/or voltage level at the output 42 and provide signals to the processor 34. Either the sensors 39 at the input 38 or the sensors 41 at the output 42 monitor the voltage level present on the DC bus 50, depending on whether the input 38 or the output 42 is connected to the DC bus 50, and the other sensors monitor the voltage level of the energy generating source, storage device 24, or load to which the power conversion device is connected.

The control unit 33 of each power conversion device preferably includes a processor 34 capable of executing a series of instructions, or a module, to send control signals to the power electronic devices 32 and memory 36 in communication with the processor 34 for storing the module capable of executing on the processor 34. The signals from the sensors 39, 41 corresponding to the voltage and/or current at the input 38 and output 42 of the power conversion device are read by the module executing on the processor 34. The module outputs the switching signals 46 to the power electronic devices 32 to regulate power flow through the device. Alternately, the control unit 33 may include dedicated control hardware to generate switching signals 46 and regulate power flow through the device. For example, a boost converter, as is known in the art, may be used to convert a first DC voltage level to a higher, second DC voltage level.

Referring again to FIG. 1, a first embodiment of the hybrid power system 10 is illustrated. The illustrated power system 10 includes at least one converter 30, each converter 30 is connected to a generating source. The power system 10 further includes at least one regulator 35, each regulator 35 connected to at least one storage device 24. A common DC bus 50 links each of the converters 30 and the regulators 35 together.

It is contemplated that the common DC bus 50 may be either a single level or a multi-level DC bus. A single level bus includes a first DC rail and a second DC rail. Each DC rail maybe, but is not limited to, a single terminal, multiple terminals connected by suitable electrical conductors, or a bus bar. The single level bus establishes one voltage potential between the first and second DC rails. A multi-level DC bus includes the first and second DC rails and further includes at least a third DC rail. The multi-level DC bus establishes at least two different voltage potentials between the DC rails. For example, a multi-level DC bus may include a first DC rail at a positive voltage potential such as 325 volts, a second DC rail at a neutral voltage potential, and a third DC rail at a negative voltage potential such as −325 volts. The net voltage potential between the first and the third DC rails is twice the voltage potential, or 650 volts, as the potential between either of the first or third DC rails and the neutral second DC rail. Thus, three different voltage potentials exist on the multi-level DC bus. Each converter 30, regulator 35, and inverter 40 may connect to any of the three voltage potentials according to the requirements of the source, storage device 24, or load connected to the respective power conversion device.

Each converter 30 is electrically coupled between a generating source and the common DC bus 50. The generating source may be of any type known in the art, including but not limited to wind, photovoltaic, hydroelectric, fuel cell, tidal, biofuel or biomass generating sources. Each of these sources generates power which is output as either an AC or a DC voltage with an amplitude suited to the type of generating source. The voltage output from the generating source is provided as an input voltage to the power electronics 32 of the converter 30. The power electronics 32 are configured to convert the voltage from the source to a desired DC voltage level as an output voltage to the DC bus 50. For example, the desired DC voltage level may be 650 volts if the power system connects to a 460 volt utility grid. Alternately, the DC voltage level may be any desired DC voltage, such as 48 volts, that may be required by a specific DC load. The DC voltage level may be allowed to vary within a preset range and selected to provide optimum energy conversion between a generating source and the DC bus 50. It is contemplated that each converter 30 may manage unidirectional or bidirectional power flow between the DC bus 50 and the generating source connected to the converter 30. For example, the converter 30 may allow bidirectional power flow between the DC bus 50 and the utility grid 12 while allowing unidirectional power flow from a generator 16 or wind turbine 18 to the DC bus 50.

Each regulator 35 is electrically coupled between the common DC bus 50 and another device with a DC voltage potential. According to the illustrated embodiment, the regulator 35 may be connected, for example, to a PV array 14, an energy storage device 24, or a DC load 22. The storage device 24 may be, but is not limited to, a battery, a fuel cell, or a flow battery. It is contemplated that each storage device 24 may be made of either a single device or multiple devices connected in series, parallel, or a combination thereof as is known in the art. Typically, the DC bus 50 operates at a first DC voltage level and the storage device 24 operates at a second DC voltage level. Alternately, the DC bus 50 and the other device 24 may operate at the same DC voltage level where the regulator 35 controls current flow between the input 38 and the output 42. It is contemplated that each regulator 35 may manage unidirectional or bidirectional power flow between the DC bus 50 and the other DC device connected to the regulator 35. For example, the regulator 35 may allow bidirectional power flow between the DC bus 50 and an energy storage device 24 while allowing unidirectional power flow from a photovoltaic (PV) array 14 to the DC bus 50 or from the DC bus 50 to a DC load 22.

The hybrid power system 10 may further include an inverter 40 electrically coupled between the DC bus 50 and an AC load. It is further understood that the converter 30 between the utility grid 12 and the DC bus 50 operates as an inverter 40 when transferring power from the DC bus 50 to the utility grid 12. The power electronics 32 of each inverter 40 may be configured to allow bidirectional power flow between the DC bus 50 and the AC load. Thus, if an AC load 20 enters a regenerative operating condition, the power generated by the AC load 20 may be returned to the DC bus 50. It is contemplated that any number and combination of loads may be connected to the system, such that a load maybe connected to the DC bus 50 either directly, through the inverter 40, through a DC-to-DC regulator 35, or any combination or multiple thereof.

A controller 70 is connected to the hybrid power system 10 via a network medium 45. It is contemplated that the network medium 45 may include, for example, CAT-5 cable for an Ethernet connection, an industrial network cable, a proprietary cabling connection, one or more routers, switches, or other network devices, a wireless device in communication with both the controller 70 and one or more of the power conversion devices, or any combination thereof. The controller 70 is also connected to a knowledge system 60. The knowledge system 60 may either be local or remote and the controller 70 is connected to the knowledge system 60 via the appropriate network medium 45 and either an internal network, such as an intranet, or via an external network, such as the Internet 55.

Figure 9:
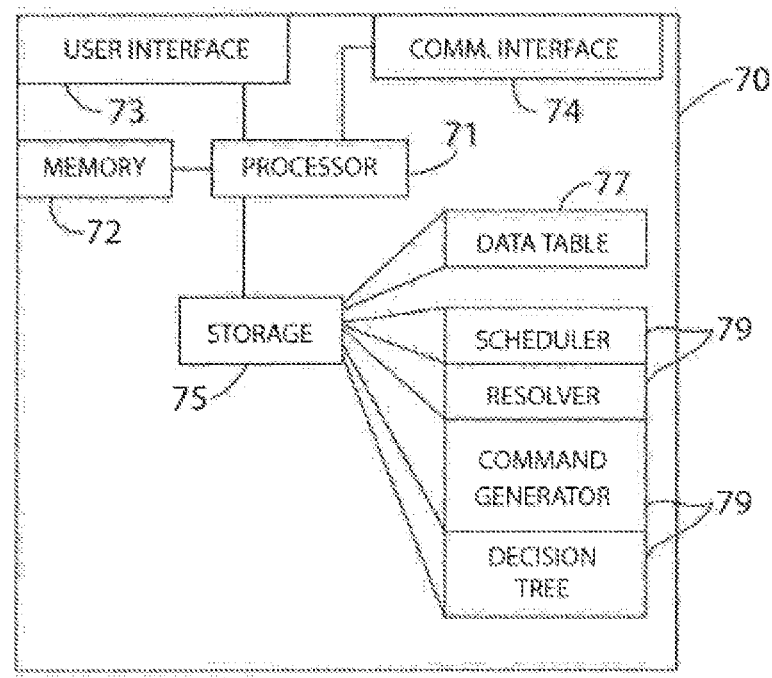
FIG. 9 is a block diagram representation of a controller incorporated into one embodiment of the hybrid power system.

With reference also to FIG. 9, the controller 70 may include one or more user interfaces 73, illustrated as a single block. The user interface 73 may provide output or receive input from a user and may include a display device and an input interface, including but not limited to, a keypad, a mouse, a touchpad, or a touchscreen. The controller 70 may be located proximate to or incorporated within the hybrid power system 10. Optionally, the controller 70 may be located remotely from the hybrid power system 10 and connected via a communication interface 74 and the network medium 45. The controller 70 includes one or more memory devices 72 to store information regarding operation of the hybrid power system as will be discussed in more detail below. It is contemplated that the memory devices 72 may be volatile, non-volatile, or a combination thereof. The controller 70 further includes a storage medium 75, where the storage medium 75 may include fixed or removable storage, such as a magnetic hard disk drive, a solid-state drive, a CD-ROM drive, a DVD-ROM drive, memory card reader, and the like. At least a portion of the storage medium 75 and/or the memory device 72 provides non-transitory storage. The controller 70 further includes a processor 71 operable to execute one or more modules 79 stored on the storage medium 75 and/or in the memory devices 72 to generate command signals for each of the power conversion devices 30, 35, 40, where the command signals control power flow within each power conversion device. The command signals may be transmitted to the power conversion devices 30, 35, 40 via the communication interface 74 and the network medium 45. According to one embodiment of the invention, the controller 70 is an industrial computer configured in a rack-mount formation. It is contemplated that the power conversion devices 30, 35, 40 and the controller 70 may each be designed for insertion into the same rack configuration such that a controller 70 may be delivered with the power conversion devices in a single housing as a stand-alone system. Alternately, the controller 70 may be implemented in part or in whole on a separate server, where the server is located, for example, at a facility owned by the manufacturer of the power conversion devices 30, 35, 40. Optionally, the server may be implemented in part or in whole within the cloud utilizing computing resources on a demand basis.

Figure 8:
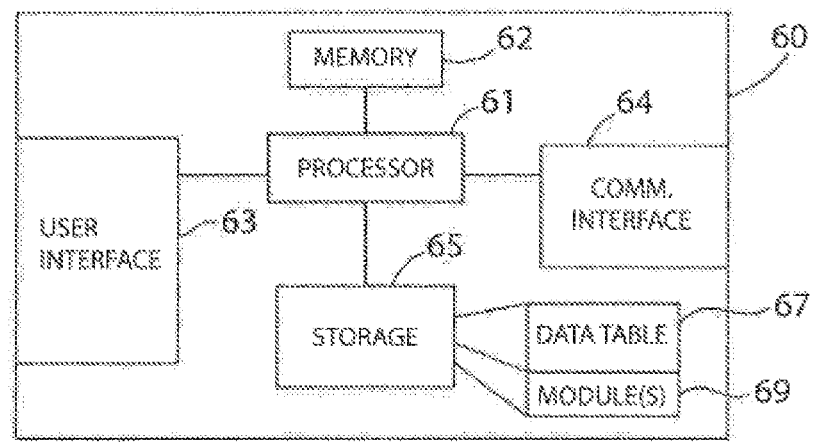
FIG. 8 is a block diagram representation of a knowledge system in communication with the hybrid power system.

With reference next to FIG. 8, an exemplary knowledge system 60 is illustrated. The knowledge system 60 may include one or more user interfaces 63, illustrated as a single block. The user interface 63 may provide output or receive input from a user and may include a display device and an input interface, including but not limited to, a keypad, a mouse, a touchpad, or a touchscreen. The knowledge system 60 may be located proximate to or incorporated within the hybrid power system 10. Optionally, the knowledge system 60 may be located remotely from the hybrid power system 10 and connected via a communication interface 64 and the network medium 45. The knowledge system 60 includes one or more memory devices 62 to store information related to operation of the hybrid power system as will be discussed in more detail below. It is contemplated that the memory devices 62 may be volatile, non-volatile, or a combination thereof. The knowledge system 60 further includes a storage medium 65, where the storage medium 65 may include fixed or removable storage, such as a magnetic hard disk drive, a solid-state drive, a CD-ROM drive, a DVD-ROM drive, a memory card reader, and the like. At least a portion of the storage medium 65 and/or the memory device 62 provides non-transitory storage. The knowledge system 60 further includes a processor 61 operable to execute one or more modules 69 stored on the storage medium 65 and/or in the memory devices 62. The knowledge system 60 also includes a database 67 stored in the storage medium 65 which contains data that may influence operation of the power system 10. The knowledge system 60 is in communication with the controller 70 via the communication interface 64 and the network medium 45 to transmit data to or receive data from the controller 70. According to one embodiment of the invention, the knowledge system 60 may be implemented in part or in whole on a separate server, where the server is located, for example, at a facility owned by the manufacturer of the power conversion devices 30, 35, 40 or by a third party. Optionally, the server may be implemented in part or in whole within the cloud utilizing computing resources on a demand basis.

Figure 3:
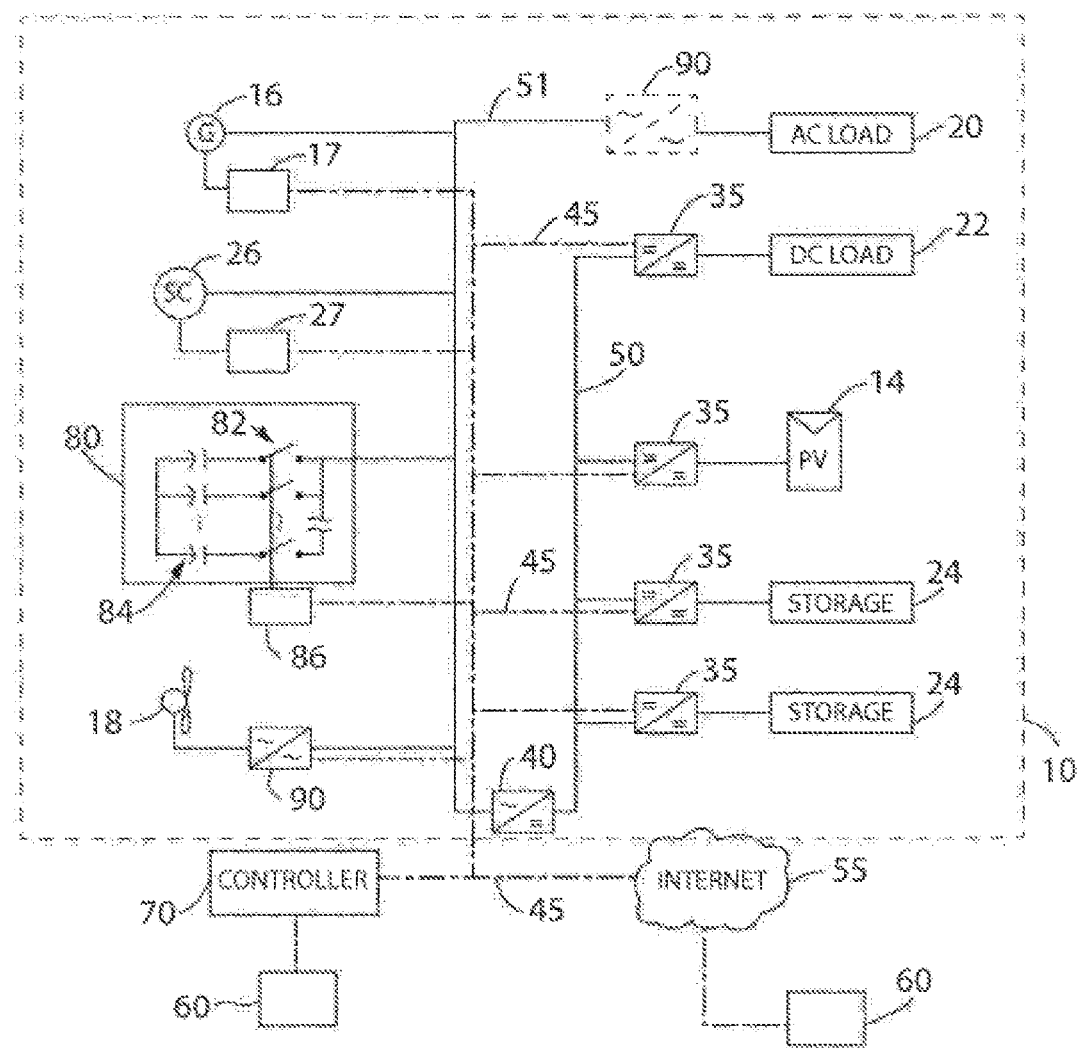
FIG. 3 is a block diagram representation of a controller and hybrid power system according to another embodiment of the invention.

Turning then to FIG. 3, a second embodiment of the hybrid power system 10 is illustrated. The power system 10 of FIG. 3 contemplates a stand-alone grid system which is independent of the utility grid. In the illustrated embodiment, the power system 10 includes a shared alternating current (AC) bus 51 in addition to the shared DC bus 50. Similar to the embodiment described in FIG. 1, the DC bus 50 may be either a single level or a multi-level bus. The power system 10 may include generating sources of any type known in the art, including but not limited to wind, photovoltaic, hydroelectric, fuel cell, tidal, biofuel, or biomass generating sources. Further, the power system 10 may be include AC loads 20, DC loads 22, or a combination thereof.

In the illustrated embodiment, a generator 16 is connected directly to the AC bus 51. A generator controller 17 is provided to keep the generator operating at the speed necessary to provide an AC voltage synchronous to the AC bus 51. The power system 10 also includes reactive power compensation devices. A synchronous condenser 26 and a capacitor bank 80 are both shown connected to the AC bus 51. Still other reactive power devices such as a thyristor controller reactor may be connected to the AC bus 51 as well. The synchronous condenser 26 includes a controller 27 to regulate the amount of reactive power supplied to the AC bus 51. Similarly, the capacitor bank 80 includes a controller 86 where the capacitor bank controller 86 may selectively open and close switches 82 to connect capacitors 84 to the AC bus 51 thereby affecting the power factor of the AC bus 53. A wind turbine 18 is illustrated as being connected to the AC bus 51 via an AC-to-AC converter 90. It is contemplated that the AC/AC converter may first convert the variable AC input from the wind turbine to a DC voltage and subsequently convert the DC voltage back to a desired AC voltage synchronous with the AC bus 51.

The common DC bus 50 of FIG. 3 includes a number of the same components connected to the bus as illustrated in FIG. 1. A PV array 14 generates DC voltage at a first voltage potential and a regulator 35 converts the voltage from the PV array 14 to the voltage on the common DC bus 50. Storage devices 24 are similarly connected to the DC bus 50 via regulators. The DC bus 50 may also include an inverter 40 connected between the DC bus 50 and the AC bus 51. It is contemplated that the inverter 40 may operate in a bi-directional manner as either a converter or an inverter to share power between the DC bus 50 and the AC bus 51.

According to the illustrated embodiment, each bus includes loads connected to the respective bus. DC loads 22 are illustrated as connected to the DC bus 50 via a regulator 35. Similarly, AC loads 20 are illustrated as connected to the AC bus 51. An optional AC-to-AC converter 90 is shown if the AC bus 51 is regulated at a voltage or frequency other than that required by the AC load 20. Optionally, the AC bus 51 may be regulated at a voltage and frequency suitable for the AC load 20 to be connected directly to the AC bus 51.

A controller 70 is again connected to the hybrid power system 10 via the appropriate network medium 45. The controller 70 is in communication with each of the converters and controllers in the power system 10 to maintain stable operation of the independent grid. Two exemplary hybrid power systems 10 have been discussed. However, it is contemplated that various other systems 10 including different combinations of components, generating sources, busses, storage devices and the like may be utilized without deviating from the scope of the invention. As will be discussed in more detail below, it is further contemplated that multiple hybrid power systems 10 may each include a separate controller 70 to regulate the components within the respective system 10, but the controllers 70 may further be in communication with each other to regulate power flow between power systems 10.

Figure 2:
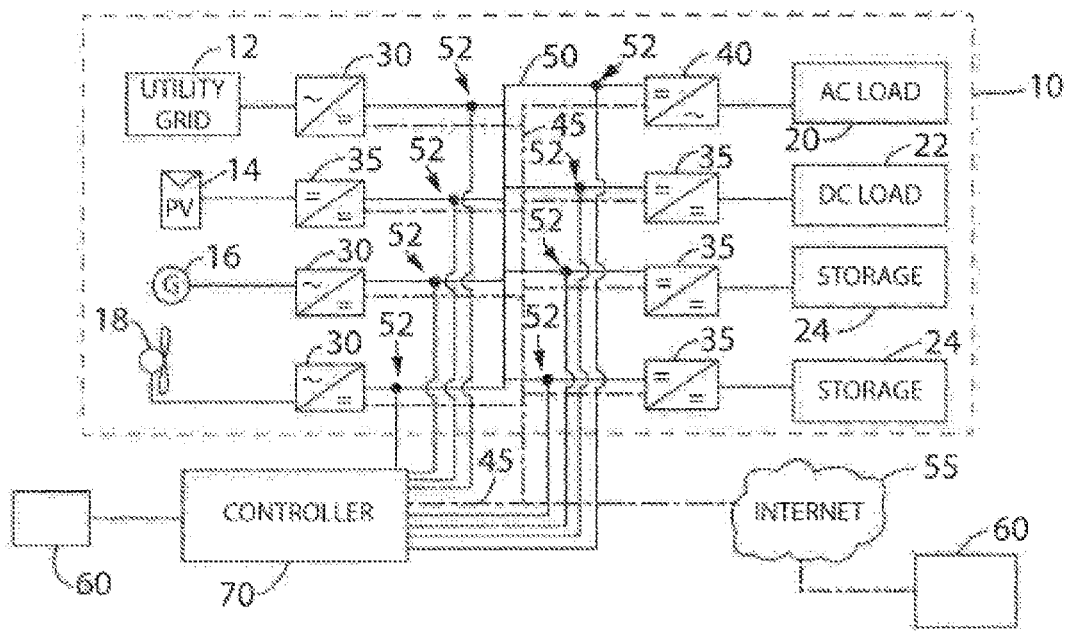
FIG. 2 is a block diagram representation of a controller and hybrid power system according to another embodiment of the invention.

In operation, the controller 70 is operable to coordinate power flow within the hybrid power system 10. The hybrid power system 10 may be of a type described in U.S. Pat. No. 9,093,862, which is co-owned by applicant and which is hereby incorporated by reference in its entirety. Optionally, the hybrid power system 10 may include other generating sources, loads, and/or power conversion devices or be a combination thereof. The controller 70 receives information on the power flow between generating sources, loads, and storage devices, as well as information from the knowledge system 60. According to the embodiment illustrated in FIG. 1, the controller 70 is in communication with each of the power conversion devices 30, 35, 40 via the network medium 45. The power conversion devices 30, 35, 40 may transmit information related to the level of power being generated by a generating source, drawn by a load, or transferred between a storage device 24 and the DC bus 50 at a periodic interval to the controller 70. Optionally, the hybrid power system 10 may include one or more sensors 52, as shown in the embodiment illustrated in FIG. 2, monitoring the voltage and/or current transferred between each power conversion device 30, 35, 40 and the DC bus 50. According to still another embodiment, a first portion of the power conversion devices 30, 35, 40 may periodically transmit information related to power flow through the device and a second portion of the power conversion devices 30, 35, 40 may include the sensor 52.

In response to the information received from the power conversion devices 30, 35, 40 and from the knowledge system 60, the controller 70 generates commands for the power conversion devices to transfer either real or complex power (i.e., a kilowatt (kW) command or a kilovar (kVar) command) as a result of the information received. Each command may be transmitted via the network medium 45 to the respective power conversion devices 30, 35, 40. The power conversion device 30, 35, 40 may then monitor and adjust the power being transferred the device to correspond to the desired command generated by the controller 70.

Figure 4:
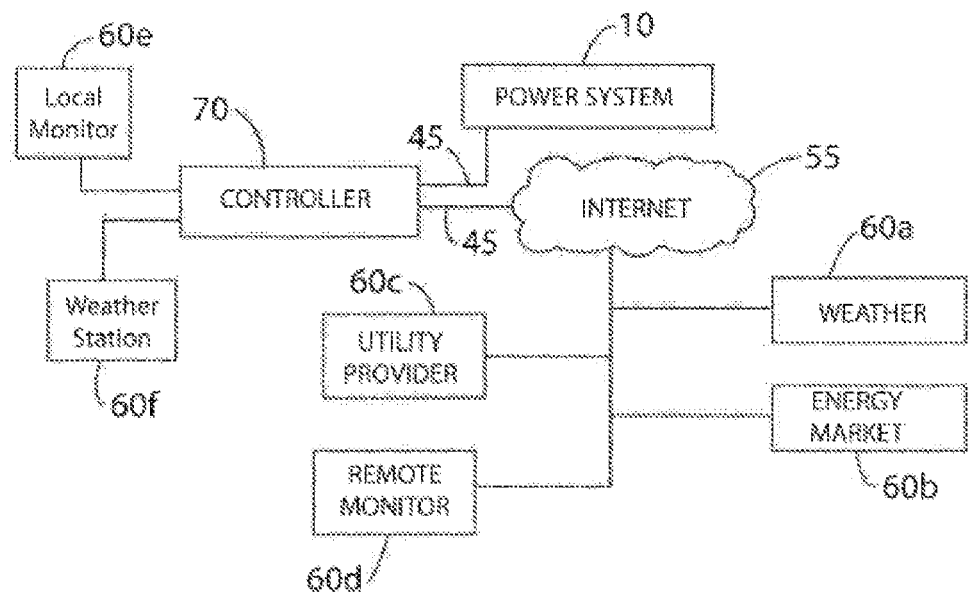
FIG. 4 is a block diagram representation of multiple knowledge systems connected to the hybrid power system according to one embodiment of the invention.

Turning next to FIG. 4, it is contemplated that multiple knowledge systems 60a-60f may be operable to provide information to the controller 70. According to the illustrated embodiment, a first set of knowledge systems 60a-60d are connected via the Internet 55 and a second set of knowledge systems 60e-60f are locally connected to the controller 70. A first knowledge system may be a weather service 60a. The weather service 60a may provide, for example, forecasts for upcoming weather conditions and provide historical weather data. The controller 70 may be configured to examine historical weather data such as average daily temperatures, sunrise or sunset time, or average rainfall, where the historical weather data forms, at least in part, a past operating state of the hybrid power system 10. The controller 70 may also be configured to receive the weather forecasts indicating, for example, the expected temperature, the expected wind speed, or the expected level of sunshine over the next few hours or days, where the weather forecast forms, at least in part, a further operating state of the hybrid power system 10. The remote weather service 60a may also be configured to work in cooperation with a local weather station 60f. The local weather station 60f may include sensors generating signals corresponding to weather conditions proximate the controller 70. The sensors may measure, for example, wind speed, insolation, rainfall, and the like. These real-time signals may supplement the historical weather data from the weather service 60a.

Another knowledge system may be an energy market 60b. The energy market 60b may be, for example, another local energy grid capable of supplying energy to or accepting energy from the hybrid power system 10. Optionally, the energy market 60b may be a commercial-level energy storage facility having the ability to supply energy to customers or local electric grids according to demand. The controller 70 may receive data corresponding, for example, to a historical level of supply or demand from the other local energy grid or energy capacity from the energy storage facility. The historical level of supply or demand by the energy market 60b may provide, at least in part, a past operating state of the controller 70. The energy market 60b may also provide a forecast of expected energy supply or demand, where the forecast provides, at least in part, a future operating state of the controller 70. Further, the controller 70 may receive real-time updates on pricing for energy from the local energy grid or energy storage facility, where the pricing may change in response to the supply and demand for available energy.

Still another knowledge system may be the energy company 60c providing energy to the utility grid. The utility provider 60c may supply, for example, rate information defining the rate a consumer may pay to receive electricity based, for example, on the time of day or based on current electricity consumption. The utility provider 60c may provide historical or real-time data corresponding to energy consumption at a particular facility or within a local region.

Yet another knowledge system may be a remote monitoring facility 60d. According to the illustrated embodiment, the monitoring facility 60d is identified as a remote facility connected via the Internet 55. Optionally, a local monitoring system 60e may also be located near or incorporated within the controller 70. The monitoring facility 60d may track power flow within the hybrid power system 10 and provide real-time and/or historical data of the power flow to the controller 70. The monitoring facility may track, for example, energy usage of the loads 20, 22 connected to the power system 10 over time, such as over the course of a day, week, month, or longer, and identify trends in power flow. Similarly, the monitoring facility may track energy generation by the energy sources 12, 18 over time and identify trends in power generation. The monitoring facility 60d may provide the tracked information to the controller 70, where the tracked information forms, at least in part, a past operating state of the hybrid power system 10. It is contemplated that the monitoring functions may be performed entirely within either the remote monitoring facility 60d or the local monitoring system 60e or, optionally, the monitoring functions may be shared between the two knowledge systems.

Figure 10:
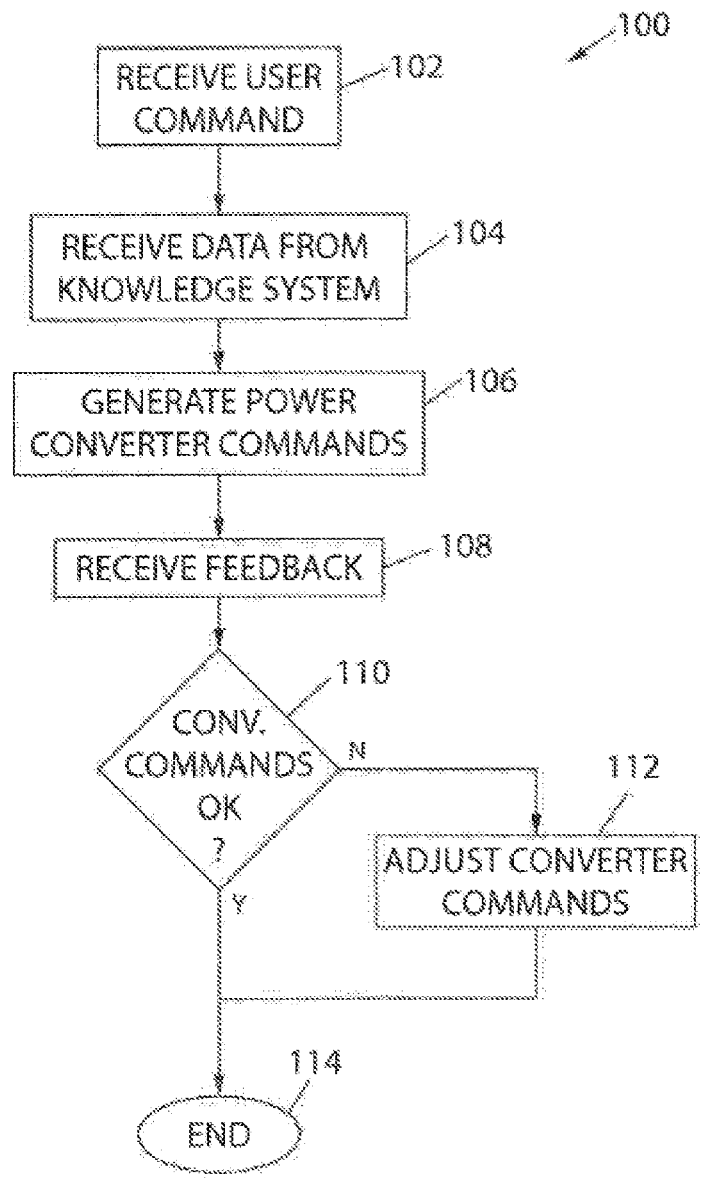
FIG. 10 is a flow diagram illustrating steps for generating power converter commands according to one embodiment of the invention.

Turning next to FIG. 10, a flow diagram 100 illustrates steps performed by the controller 70 to generate control commands for each of the power converters 30, 35, 40 within the hybrid power system 10. At step 102, the controller 70 receives an initial user command. It is contemplated that the user command may be entered directly at the controller 70 via the user interface 73 or may be communicated to the controller 70 via the communication interface 74. The user command may be stored in memory 72 or in storage 75 for future access. It is further contemplated, that the user command may be, for example, a schedule with multiple commands assigned to different times for execution and the schedule may be stored in the data table 77. The controller 70 either receives the user command directly or retrieves a stored user command.

At step 104, the controller 70 receives data from one or more knowledge systems 60 connected to the hybrid power system 10. As discussed above, the knowledge systems 60 may include data corresponding to a past or future operating state of the hybrid power system 10. The data may correspond to logged data during operation or predicting data that will impact operation of the hybrid power system 10. After receiving the user command and data from one or more knowledge systems 70, the controller 70 will utilize the user command and the received data to generate control commands to each of the power converters 30, 35, 40 within the hybrid power system 10, as shown in step 106. The control commands set a desired operating point for each power converter. It is contemplated that the desired control command may be, for example, a kilowatt (kW) or a kilovar (kvar) command. The kW command defines a desired amount of real power to transferred through the power converter. The kvar command defines a desired amount of reactive power provided to an AC load or drawn from an AC generating source. Optionally, the control command may be a desired voltage range within which the power converter is idle and outside of which the power converter either transfers power to or draws power from the DC bus 50. According to still another embodiment, the control command may be a desired voltage or current to be present at either the input 38 or the output 42 of one of the power converters 30, 35, 40.

Figure 11:
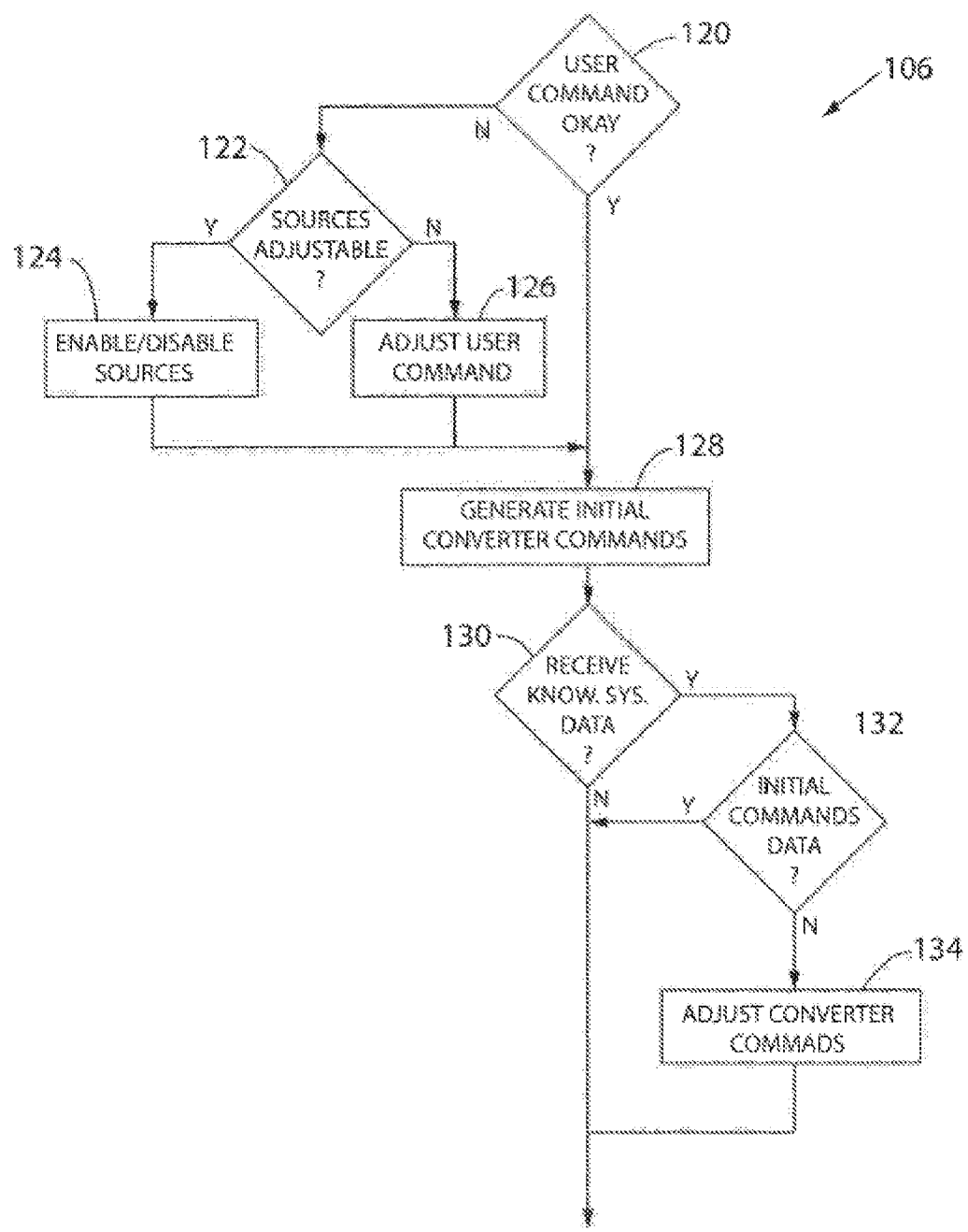
FIG. 11 is a flow diagram-illustrating additional steps for generating power converter commands from FIG. 10.

Referring also to FIG. 11, additional steps for generating control commands 106 to each of the power converters 30, 35, 40 are illustrated. At step 120, the controller 70 verifies whether the user command can be executed. The user command may, for example, specify a desired amount of power to be supplied by the generating sources. Each generating source has a maximum power level it is capable of outputting, and the controller 70 may verify that the combined output of the generating sources is able to satisfy the commanded power level. If, for example, one of the generating sources is removed from service for maintenance, the total capacity of the generating sources may be less than the command. Optionally, the power system, may include a number of sources that are selectively enabled and disabled. If the command is greater than the supply, the controller 70 may determine whether additional sources are available to be enabled, as shown in step 122. If additional sources are available, the controller 70 may enable the additional sources, as shown in step 124. If either the sources are not available to be enabled or the command exceeds the system capacity, the controller 70 may adjust the user command as shown in step 126. Similarly, if the user command is significantly less than the system capacity, the controller 70 may be configured to disable one or more sources, as shown at step 124, such that the sources that are generating power may operate at a more efficient operating point.

After verifying that the system is able to satisfy the user command, the controller 70 generates control commands for each of the power converters 30, 35, 40 as shown in step 128. It is contemplated that the controller 70 may be configured to utilize different methods for generating the control commands without deviating from the scope of the invention. For example, the controller 70 may divide the user command evenly among each of the generating sources to supply a desired amount of power. Optionally, the controller 70 may generate control commands proportional to the capacity of each generating source to supply the desired amount of power. In some instances, the user command may define a desired source, such as one of the alternative energy sources 14, 16, 18 or that energy be provided from an energy storage device 24 according to a time of day. The controller 70 generates an initial set of control commands for each of the converters 30 and regulators 35 accordingly.

At step 130, the controller 70 determines whether a knowledge system 60 is connected to the hybrid power system and whether the knowledge system 60 has provided data as an input to the controller 70. If no knowledge system 60 is connected or if the knowledge system has not provided data to the controller 70, the initial set of control commands for each of the power converters 30, 35, 40 remains unchanged and are transmitted to the corresponding power converter 30, 35, 40. If, however, one or more knowledge systems 60 are connected to the hybrid power system 10 and have provided data to the controller 70, the controller 70 uses the data to verify whether the initial set of control commands are acceptable, as shown in step 132.

Verification of the initial set of control commands is dependent on the type of data provide to the controller 70. As discussed above, the knowledge system may provide data corresponding to weather, energy supply or demand, energy costs, or usage. The data may be a past operating state including, for example, logged weather conditions, such as temperature, wind speeds, insolation, and the like, or historical trends in energy supply or demand. The data may also be a future operating state including, for example, a weather forecast for the current day or over an extended period of time such as a week or month. The future operating state may be a predicted supply of energy based, for example, on capacity and maintenance schedules for energy generating sources. If, for example, a hybrid power system includes both a photovoltaic source 14 and a wind turbine 18, the controller 70 may utilize a weather forecast as a future operating state. When the weather forecast indicates sunny and calm weather, the controller 70 increases the control command for the photovoltaic source 14 and reduces the control command for the wind turbine 18. When the weather forecast indicates overcast and windy weather, the controller 70 increases the control command for the wind turbine 18 and reduces the control command for the photovoltaic source 14. It is contemplated that the exemplary weather service may be configured as a knowledge source 60 to transmit future operating states with data values for each weather condition forecast. A range of data values, for example, from one to one hundred may indicate a range of insolation from fully sunny to fully cloudy. Similarly, a forecast wind speed may be transmitted directly as a data value. Each knowledge source 60 is configured to transmit data to the controller 70 in a predefined format such that the data received at the controller 70 may be used to adjust the initial converter commands as necessary, as shown in step 134.

Turning again to FIG. 10, the controller 70 also receives feedback corresponding to the present operating state of the hybrid power system 10, as shown in step 108. As discussed above, the feedback may be transmitted via the network 45 from each of the power conversion devices 30, 35, 40; received directly via sensors 52 distributed throughout the system 10, or a combination thereof. At step 110, the controller 70 may evaluate the current operating status of the power system 10 and determine whether the control commands for each of the power conversion devices 30, 35, 40 are still appropriate to achieve the desired user command. The controller 70 may monitor, for example, whether the utility grid 12 is operational and/or whether the power system 10 is operating in a grid-tied or in a grid-independent operation mode. If the grid fails, an increased demand may be required from the other generating sources or from the energy storage devices 24. If the grid resumes operation after interruption, the control commands to alternative sources and/or control commands to energy storage devices 24 may be reduced or, for energy storage devices 24, the control command may cause the energy storage device 24 to draw from rather than supply power to the shared electrical bus 50. Changes to the converter commands are performed based on the feedback from the hybrid power system 10 as illustrated in step 112.

FIGS. 10 and 11 have been described herein to illustrate one embodiment of the controller 70 for generating control commands to the power converters 30, 35, 40 in a hybrid power system. The flow diagrams are not intended to be limiting and it is contemplated that the steps discussed therein may be performed in different orders or combinations without deviating from the scope of the invention.

According to one embodiment of the invention, a commercial, residential, or industrial electricity consumer may own one or more alternate energy assets 14, 16, or 18 and be connected to the utility grid 12. The controller 70 receives information from one or more of the knowledge systems 60 to determine how the alternate energy asset operates. For discussion, the electricity consumer is a residential consumer and owns a PV array 14 and an energy storage device 24. An initial user command may be to supply all power to the electrical loads from the PV array 14. The monitor system 60*d* logs operation over a period of time. The monitor system 60*d* determines that the PV array 14 generates little or no energy during the early morning hours and then begins generating an increasing amount of energy throughout the morning and up until noon. As the day continues beyond noon, the PV array 14 generates less energy until it again generates little or no energy in the evening hours. The monitor system 60*d* further determines that the consumer has a low volume of electrical loads 20, 22 that persist throughout the day. The consumer has an increase in the power required by the loads 20, 22 for an hour or two in the morning and then for several hours in the evening.

It is a first aspect of the invention that the controller 70 receives the logged information from the monitor system 60d and a desired operation from the user command and generates control commands to the regulators 35 located between the PV array 14 and the DC bus 50 and between the DC bus 50 and the energy storage device 24. Further, the controller 70 generates control commands to the converter 30 between the utility grid 12 and the DC bus 50 and the inverter 40 between the DC bus 50 and the AC loads 20. During the peak load hours in the morning, the PV array 14 is not yet generating sufficient energy for the loads 20 and the energy storage device 24 may be depleted from prior use. The controller 70, therefore, may adjust the initial user command of drawing all power from the PV array 14 and commands the converter 30 to supply power from the utility grid 12 to the DC bus 50 for use by the inverter 40 to power the loads 20. Energy generated by the PV array 14 may be commanded to be stored in the energy storage device 24.

When the peak usage in the morning is complete, the PV array 14 is generating sufficient energy for the persistent load and the controller 70 generates new control commands. The controller 70 disables the converter 30 between the utility grid 12 and the DC bus 50 and follows the initial user command, commanding the PV array 14 to supply its full power to the DC bus 50. The controller 70 commands the inverter 40 to draw the power it needs for the persistent AC loads 20 and commands the regulator 35 between the DC bus 50 and the energy storage device 24 to transfer the excess energy generated by the PV array and present on the DC bus 50 to the energy storage device 24.

When the period of time for the increased evening loads begins, the controller 70 again generates new commands for the power conversion devices. The power generated by the PV array 14 has begun to decline and cannot supply all of the power required by the load 20. The controller 70 again adjusts the initial user command, however, the controller 70 recognizes the charge level in the energy storage device 24 and may draw the stored power before reverting to the utility grid in order to satisfy the initial user command. The controller 70, therefore, commands the regulator 35 between the energy storage device 24 and the DC bus 50 to begin transferring power back to the DC bus 50 for use by the loads 20. The combination of the PV array 14 and the energy storage device 24 continue to supply power until the energy storage device is depleted and the PV array 14 is generating little or no energy. When the PV array 14 and the stored energy can no longer supply the load, the controller 70 again commands the converter 30 between the utility grid 12 and the DC bus 50 to supply power for the loads 20 and commands the regulator 35 between the energy storage device 24 and the DC bus 50 to become disabled.

It is another aspect of the invention that the controller 70 receives information from a weather service 60a. The controller 70 may receive, for example, a forecast for a sunny day or for a cloudy day. Similarly, the controller 70 may receive a daily indication of the time for sunrise as well as for sunset. The controller 70 may modify the commands generated above according to the further information received from the weather service 60a.

For example, on a day with a forecast for sun, the controller 70 may implement the control routine described above without alteration. On a day with a forecast for clouds, the controller 70 may alter the time at which the converter 30 between the utility grid 12 and the DC bus 50 is initially dropped out. The controller 70 determines, for example, that the PV array 14 will generate less energy than on a sunny day and allow the utility grid 12 to provide some energy to the DC bus 50 for charging the storage device 24. Thus, the storage device 24 may receive the same amount of charge as on a sunny day. Further, on days that experience a greater duration of sunshine (i.e., earlier sunrise and later sunset), the controller 70 determines that the PV array 14 will generate more energy.

In combination with the forecast weather, the controller 70 may utilize feedback signals from the local weather station 60f. If, for example, a day is predicted to be sunny, yet experiences a period of cloudiness, the weather station 60f generates signals corresponding to the level of insolation of the PV array 14. The controller 70 may also monitor the output power being generated by the PV array 14. The controller may then determine whether the real-time weather conditions and power generated by the PV array 14 are sufficient to generate the power expected as determined from the forecast conditions. If not, the controller 70 may adapt the controller commands in response to the real-time operating conditions.

According to still another aspect of the invention, the controller 70 may further utilize all information from each of the knowledge stores 60 in combination to generate control commands for the power converters. For example, the monitor system 60d may have historical operating information indicating that on days with the longest amount of sunshine, the PV array 14 is capable of generating more than enough energy to supply the needs of the electricity customer for the entire day. The controller 70 may then determine a period of time during the peak producing hours for the PV array 14 during which the converter 30 between the utility grid 12 and the DC bus 50 is operated in a reverse direction to supply the excess generation capacity to the utility grid 12. In combination with the weather forecast and with historical generation capacity of the PV array on sunny or cloudy days, the controller 70 may further adjust the duration for which the converter 30 is allowed to supply power to the utility grid 12, reducing the duration, for example, on cloudy days such that the energy storage device 24 may still be fully charged in the evening to provide the power demanded by the loads 20, 22 during the evening hours.

Figure 7:
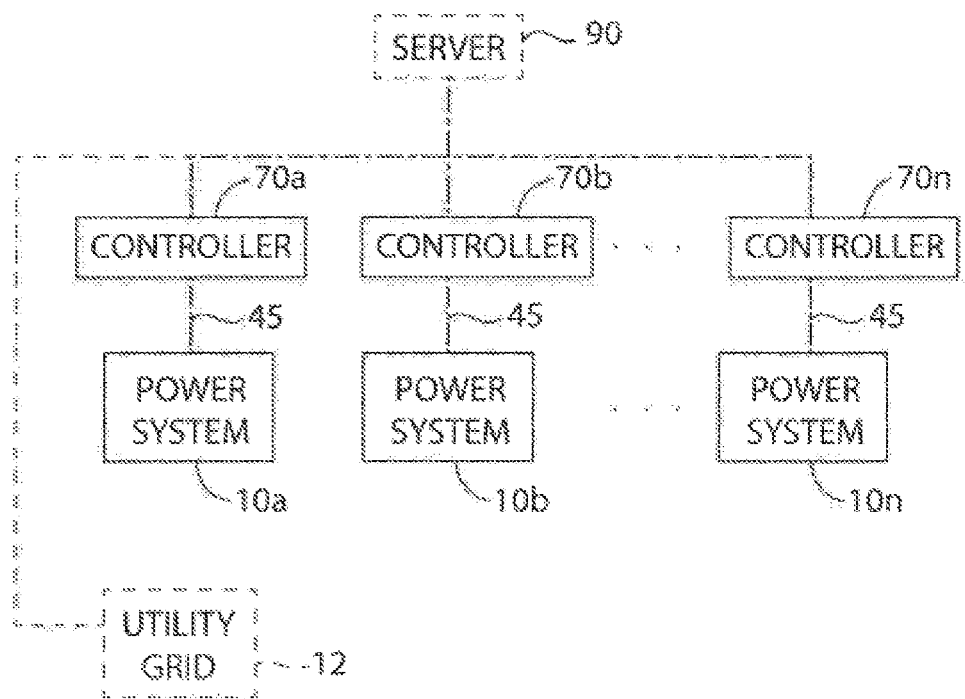
FIG. 7 is a block diagram representation of multiple controllers and multiple hybrid power systems operating in tandem to realize a coordinated power system.

With reference also to FIG. 7, it is contemplated that multiple hybrid power systems 10 may be connected together and the controllers 70 of each power system may be in communication with each other to provide the most efficient use of the resources available in each system 10. A supervisory controller 90 may also be provided to monitor operation of each of the power systems 10 and to coordinate the transfer of power between systems 10. According to the illustrated embodiment, a server is provided as the supervisory controller 90. The server may be connected to each of the controllers 70 via a network and a network medium, such as the internet and/or a local intranet. Optionally, one of the controllers 70 may be configured to execute a supervisory control routine and may operate as the supervisory controller 90 to the other controllers 70. As illustrated, it is contemplated that any number (i.e., "n") of controllers 70 may be connected. Each controller 70 is connected to a hybrid power system 10. A network connection may be established between the controllers 70. Although the utility grid 12 is shown via a separate connection, it is contemplated that the utility grid 12 may be a generating source in one or more of the hybrid power systems 10. In other embodiments, the utility grid 12 may not be present.

Each controller 70 includes information related both to the current and forecast operating state of the hybrid power system 10. The controller 70 generates commands for the power converters present within its respective power system 10. Controllers 70 from remote power systems 10 may serve as a knowledge system 60 to a first controller 70a. For example, the first controller 70a receives information from each of the knowledge systems 60 to which it is connected and determines a forecast of power generation and power usage within, its respective system 10a. The first controller 70a may provide the forecast information to a second controller 70b. The second controller 70b may, in turn, utilize the information provided to determine its own forecast of power generation and power usage. Further, as each power system 10 is operating, the respective controller 70 for each system may provide real-time operating conditions to the controller of the other system, such that each controller 70 may adjust the commands output to the power converters within its respective hybrid power system 10.

According to one exemplary environment, the first hybrid power system 10 may be the residential system described above. The second power system 10 may be located, for example, in a nearby industrial park, where a company has installed a wind turbine 18 and a PV array 14 where either alternative energy asset has sufficient capacity to supply the entire electrical requirements for the company. The two alternative energy assets, in combination, generate excess energy that the company plans to supply on the open market. The second hybrid system 10 may similarly have its own monitor 60d with historical operating performance of the second hybrid system 10. The controller 70 on the second hybrid power system, therefore, determines an amount of power to provide on the market. The controller 70 may further have rate information, for example, from the utility provider 60c and decide, to price the excess capacity at a rate less than the utility provider. The first hybrid power system 10 may also include a converter 30 connected between the second hybrid power system as an alternate energy source and the DC bus 50 on the first hybrid power system. The controller 70 of the first hybrid power system may compare rates between the utility provider 60c and the second hybrid power system to determine whether to draw energy from the utility grid 12 or from the second hybrid power system 10. The second hybrid power system 10 serves as an alternate energy market to the utility grid.

It is further contemplated that the controller 70 may adapt the predictive control commands as a function of real-time events. As shown in FIG. 1, the controller 70 is in communication with each power conversion device 30, 35, 40 via the network medium 45. The controller 70 may receive information from the sensors 39, 41 within the power conversion devices corresponding to the voltage and/or current present at the input 38 or output 42 and determine the power flow through each device. Optionally, the control unit 33 within the power conversion device may determine the power flow within the device and transmit the power flow data directly to the controller 70. According to an alternate embodiment illustrated in FIG. 2, the hybrid power system 10 may include sensors 52 located proximate one or more of the power conversion devices providing signals back to the controller 70 corresponding to voltage, current, or power present at the DC bus side of the power conversion device. Further, the controller 70 may receive other information from each power conversion device including, but not limited to, the amount of charge present in the energy storage devices 24, the amount of load 20, 22 being demanded, or the amount of energy being generated by each of the alternative energy assets 14, 16, 38. If the real-time information indicates operating conditions outside of the predicted operating conditions, the controller 70 may update any of the control commands to the power conversion devices in real-time to account for the current operating conditions.

Figure 12:
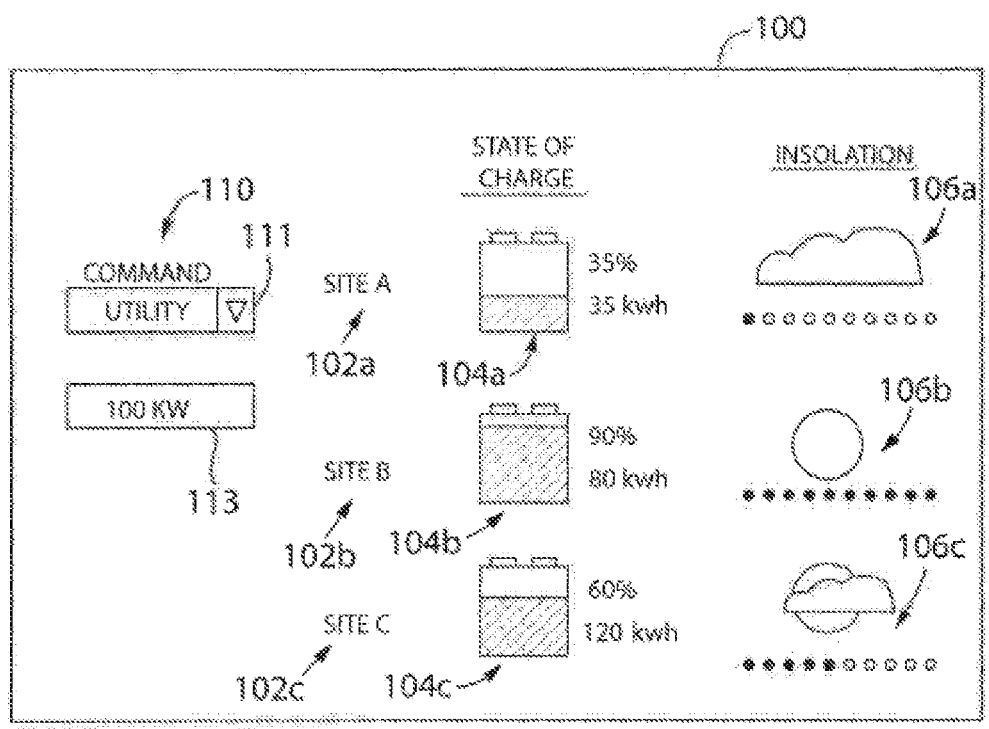
FIG. 12 is an exemplary user interface for a controller according to one embodiment of the hybrid power system.

Turning next to FIG. 12 an exemplary user interface for a supervisory controller 90 is illustrated. The illustrated embodiment shows three hybrid power systems 10. A first system is located at Site A 102a, a second system is located at Site B 102b, and a third system is located at Site C 102c. A command entry section 110 allows the user to enter a user command for a desired operation of the hybrid power systems 10. A drop-down menu 111, a text box 113, or a combination thereof may be provided to receive the user command. Optionally, still other user interface options may be provided such as check boxes, radio buttons, dial indicators, icons, and the like to prompt and/or receive a user command.

An exemplary determination of commands to each hybrid power system 10 from the supervisory controller will be presented according to the illustrated embodiment. An initial user command requires 100 kW of power be supplied to the utility grid from the combination of hybrid power systems 10. For illustration, it is contemplated that each of the power systems 10 have approximately the same generation capacity. Initial commands to each hybrid power system 10 may be generated based, for example, on a proportional distribution between the systems and may be roughly 33 kW for each system. The supervisory controller, however, receives feedback corresponding to the current operating state of each system. Site A 102a provides its current state of charge 104a for the storage devices 24 present at the site and the current state of insolation 106a. Site A 102a is overcast and the storage devices 24 have been discharged to 35% due to electrical loads and/or the inability to generate power from the PV array 14 to charge the storage devices. Site B 102b and Site C 102c similarly provide their current state of charge 104b, 104c for the storage devices 24 present at the site and the current state of insolation 106b, 106c. Site B is sunny and has almost a fully charge while Site C is partially sunny and has a moderate level of charge. The supervisory controller 90 may, therefore, reduce the initial command from the hybrid power system 10 at Site A, increase the command from Site B to compensate for the reduced command at Site A, and leave the initial command for Site C. Each of the modified commands for energy transfer to the utility grid is then provided from the supervisory controller 90 to the controllers 70 of the respective hybrid power system 10 as a user command discussed above. The controllers 70, in turn, generate control commands to each power converter 30, 35, 40 within the respective hybrid power system 10 to supply the requested energy to the utility grid.

Although the invention has been discussed with respect to a specific example and particular knowledge systems 60, it is contemplated that various other combinations of energy generating sources and/or loads may be utilized within the hybrid power system 10 and that other knowledge systems 60 having information impacting operation of the hybrid power system 10 may be connected to the controller 70 for generation of control commands to each power converter.

According to another aspect of the invention, the controller 70 provides traceability of energy generated by the hybrid power system 10. As indicated above, the controller 70 receives information corresponding to power flow through each of the power conversion devices 30, 35, 40 either via communications on the network medium 45 or via sensors 52 connected proximate each device. The controller 70 tracks the generation of electricity, storage of electricity, and delivery of electricity to the loads 20, 22 such that a complete log of the energy flow within the hybrid power system 10 is generated.

With reference to the above exemplary system 10 for a residential electricity consumer with a PV array 14 and energy storage device 24, the controller 70 tracks the energy generated by the PV array 14 and determines whether the energy is stored in the storage device 24, supplied to the loads 20, 22, or provided to the utility 12. Similarly, the controller 70 tracks the amount of energy supplied by the utility 12 and whether it is supplied to the loads 20, 22 or stored, in the energy storage device. Finally, the controller 70 also tracks the level of energy stored in the storage device 24, from what source it is received and when it is provided to the loads 20, 22.

According to one embodiment of the invention, the controller 70 may use, for example, a first-in-first-out (FIFO) approach with respect to allocating energy within the energy storage device 24. According to the FIFO approach, when energy within the energy storage device 24 is received from multiple sources, energy within the energy storage device 24 is attributed to a particular source according to the order in which it was received from a particular source. Therefore, if the PV array 14 first charges the energy storage device 24 to half its rated capacity and the utility grid 12 charges the energy storage device 24 to full capacity, the energy delivered from the energy storage device 24 is first attributed to the PV array 14 until the energy storage device has been discharged to half capacity. The remaining energy delivered from the energy storage device 24 is then attributed to the utility grid 12.

According to another embodiment of the invention, the controller 70 may use a proportional approach with respect to allocating energy within the energy storage device 24. According to the proportional approach, when energy within the energy storage device 24 is received from multiple sources, energy within the energy storage device 24 is attributed to a particular source according to the proportion of rated capacity in which it was received from a particular source. Therefore, if the PV array 14 first charges the energy storage device 24 to half its rated capacity and the utility grid 12 charges the energy storage device 24 to full capacity, as energy is delivered from the energy storage device 24 to loads 20, 22 half of the energy delivered is attributed to the PV array 14 and half the energy delivered is attributed to the utility grid 12.

It is contemplated that still other methods of allocating the energy within the hybrid power system 10 may be utilized when multiple sources supply energy to a single device. In each embodiment, the controller 70 monitors the power flow within the hybrid power system 10 and generates a complete log of the energy flow within the system 10. The log may be provided to the monitor system 60d for historical trending or, optionally, the monitor system 60d may generate an independent log.

The log allows the controller 70 to provide a complete energy audit of the hybrid power system 10 in real-time and the information in the log may further be integrated into the controller's command generation functions. For example, if a system includes multiple energy storage devices 24, the controller 70 may detect whether one of the energy storage devices 24 has had more power cycling than another. The controller may generate control commands to the power conversion devices accordingly to balance the power cycling of the energy storage devices 24, thereby extending the life cycle of each device and extending the time interval between required maintenance for each device 24.

Figure 6:
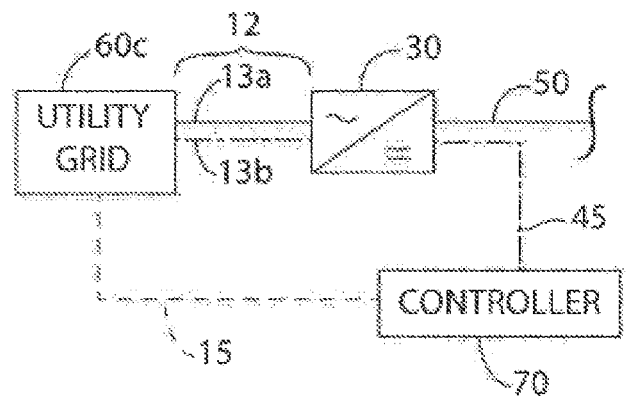
FIG. 6 is a block diagram representation of an exemplary communication interface between a utility grid and a controller for the hybrid power system according to one embodiment of the invention.

According to yet another aspect of the invention, the controller 70 may be in communication with the utility grid provider 60c to adapt the control commands responsive to the requirements of the utility grid 12. Referring to FIG. 6, the controller 70 is in communication with the utility grid provider 60c. According to one embodiment of the invention, the utility grid provider 60c may transmit data via the utility grid. According to the illustrated embodiment, both power and data are transmitted via the cables 13 for the utility grid. Power is represented by reference numeral 13a while data is represented by reference numeral 13b. Both power 13a and data 13b may be conducted via the cables 13 according to known methods of power line communication. Optionally, a separate communication line 15 may be established between the controller 70 and the utility grid provider 60c. The separate communication line 15 may be any suitable communication method such as via wired or wireless Ethernet communication over the Internet 55.

It is contemplated that the communications between the controller 70 and the utility grid provider 60c may be established via secure communications protocols. The controller 70 monitors real-time operation of the hybrid power system 10 and generates control commands for the power conversion devices as discussed above. The utility grid provider 60c similarly monitors real-time operation of the utility grid 12.

According to one aspect of the invention, the utility grid provider 60c may provide commands to the controller 70 to provide power factor correction in the grid 12. The utility grid provider 60c desires to provide power to electricity consumers having near unity power factor. It is desirable to have the current and the voltage in phase with each other. Loading of the utility grid 12 and/or accepting energy generated from distributed power sources may cause the power factor on the utility grid 12 to shift to a non-unity power factor. Although the utility grid 12 includes reactive components distributed throughout the grid that may be switched on or off of the grid to provide power factor compensation, the utility grid 12 in communication with the controller 70 of the present invention may similarly utilize the hybrid power system 10 to provide power factor correction. The utility grid 12 may generate a kvar command to the controller 70 indicating a desired amount of reactive power to be supplied to or transferred from the utility grid 12. The controller 70, in turn, generates a control command to the converter 30 between the utility grid 12 and the DC bus 50 to achieve the desired kvar command. The controller 70 may also perform an initial determination of the current operating status of the hybrid power system 10 to determine whether it has the capacity to accommodate the kvar command. If not, the controller 70 may send a responsive message to the utility grid provider 60c indicating it needs to obtain the power factor correction from another source.

According to another aspect of the invention, the utility grid provider 60c may provide commands to the controller 70 to supplement energy generation on the grid 12 or to reduce power consumption by the hybrid power system 10. Even as electricity consumers develop alternative energy assets to supply a part or all of their electricity needs, electricity consumers often rely on the utility grid 12 as a secondary power source. However, as the number of distributed power generation systems increases, the potential fluctuation in the power required from the utility grid 12 similarly increases. If, for example, all of the distributed power generating sources are supplying energy, the demand on the utility grid 12 is reduced and may, in fact, receive power from at least a portion of the distributed power generating sources. If, however, a number of the distributed power generating sources cease generating (e.g., overcast conditions reduce or eliminate PV array generation), the demand on the utility grid 12 is increased. Rather than building additional power generation facilities for the utility grid 12, the utility grid provider 60*c* may identify the distributed power generation sources connected to the grid 12 and via the controller 70 command a portion of those distributed power generating sources to supply a portion of their additional capacity to the utility grid 12 during periods of peak consumption.

For example, a hybrid power system 10 including one or more energy storage devices 24 may be commanded to supply power to the utility grid 12 during periods of peak consumption. In exchange, the utility grid provider 60*c* compensates the owner of the hybrid power system 10 for the power supplied and/or may provide discounted rates during off-peak times by which the controller 70 may recharge the energy storage device 24.

It should be understood that the invention is not limited in its application to the details of construction and arrangements of the components set forth herein. The invention is capable of other embodiments and of being practiced or earned out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed:

1. A power control system for managing energy transfer, the power control system comprising:
   a shared electrical bus including an electrical energy generating source, an electrical energy storage device, and an electrical load, each connected to the shared electrical bus; and
   a controller operable to execute a plurality of instructions stored in a non-transitory memory on the controller to:
      receive a command corresponding to a desired operation of the power control system,
      receive at least one input corresponding to one of a past operating state and a future operating state of the power control system,
      generate a plurality of control commands, wherein each of the plurality of control commands corresponds to one of the electrical energy generating source, the electrical energy storage device, and the electrical load, and wherein each of the plurality of control commands is generated as a function of the command and of the at least one input, and
      transmit each of the plurality of control commands to the corresponding electrical energy generating source, electrical energy storage device, or electrical load to manage energy transfer between the electrical energy generating source, the electrical energy storage device, and the electrical load; and
   at least one sensor providing a signal to the controller corresponding to one of a voltage, a current, and a level of energy transfer between the shared electrical bus and one of the electrical energy generating source, the electrical energy storage device, and the electrical load, wherein the controller further generates the plurality of control commands as a function of the signal received from the at least one sensor and wherein the controller is further operable to generate a log storing the present operating state for each of the electrical energy generating source, the electrical energy storage device, and the electrical load over a predefined duration, and wherein the at least one input corresponding to the past operating state of the power control system is the log.

2. The power control system of claim 1, further comprising a power converter connected between the electrical energy generation source and the shared electrical bus to control energy transfer between the electrical energy generating source and the shared electrical bus, wherein the controller is connected to the electrical energy generating source through the power converter.

3. The power control system of claim 1, further comprising an energy regulator connected between the electrical energy storage device and the shared electrical bus to control energy transfer between the electrical energy storage device and the shared electrical bus, wherein the controller is connected to the electrical energy storage device through the energy regulator.

4. The power control system of claim 1, further comprising an inverter connected between the electrical load and the shared electrical bus to control energy transfer between the electrical load and the shared electrical bus, wherein the controller is connected to the electrical load through the inverter.

5. The power control system of claim 1, further comprising a second sensor providing a signal to the controller corresponding to one of a voltage, a current, and a level of energy transfer between the shared electrical bus, the electrical energy generating source, the electrical energy storage device, and the electrical load, wherein the controller further generates the plurality of control commands as a function of the signal received from the second sensor.

6. The power control system of claim 5, wherein the controller is further operable to generate a log storing the signal from the second sensor over a predefined duration, and wherein the at least one input corresponding to the past operating state of the power control system is the log.

7. The power control system of claim 1, wherein the controller is in communication with a utility grid provider and wherein the controller is further operable to receive a second command from the utility grid provider and generate the plurality of control commands responsive to the second command from the utility grid provider.

8. The power control system of claim 1, further comprising a second electrical bus connected to the shared electrical bus, the second electrical bus including connected to the second electrical bus at least one of a second electrical energy generation source, a second electrical energy storage device, and a second electrical load; and
   a second controller configured to generate a plurality of second control commands, wherein each of the plurality of second control commands corresponds to one of the second electrical energy generation source, the second electrical energy storage device, and the second electrical load, wherein the second controller is operable to execute a plurality of instructions stored in a second non-transitory memory to:
      receive a second command corresponding to a desired operation of a second portion of the power control system, receive at least one second input corresponding to one of a past operating state and a future operating state of the second portion of the power control system, generate the plurality of second control commands as a function of the second command and of the at least one second input, and transmit each of the plurality of second control commands to the corresponding second electrical energy generation source, second electrical energy storage device, and second electrical load to manage energy transfer therebetween.

9. The power control system of claim 8, wherein the shared electrical bus is connected to the second electrical bus through a power converter.

10. The power control system of claim 8, wherein the shared electrical bus is connected to the second electrical bus through an inverter.

11. The power control system of claim 8, wherein the shared electrical bus is one of an AC bus and a DC bus, and wherein the second electrical bus is one of an AC bus and a DC bus.

12. The power control system of claim 8, further comprising a third electrical bus connected to one of the shared electrical bus and the second electrical bus, the third electrical bus including connected to the third electrical bus at least one of a third electrical energy generation source, a third electrical energy storage device, and a third electrical load.

13. The power control system of claim 12, wherein the third electrical bus is connected to one of the shared electrical bus and the second electrical bus through a power converter or an inverter.

14. The power control system of claim 12, wherein the shared electrical bus is one of an AC bus and a DC bus, wherein the second electrical bus is one of an AC bus and a DC bus, and wherein the third electrical bus is one of an AC bus and a DC bus.

15. A power control system for managing energy transfer, the power control system comprising:
a shared electrical bus including an electrical energy generating source, an electrical energy storage device, and an electrical load, each connected to the shared electrical bus; and
a controller operable to execute a plurality of instructions stored in a non-transitory memory on the controller to:
receive a command corresponding to a desired operation of the power control system,
receive at least one input corresponding to one of a past operating state and a future operating state of the power control system,
generate a plurality of control commands, wherein each of the plurality of control commands corresponds to one of the electrical energy generating source, the electrical energy storage device, and the electrical load, and wherein each of the plurality of control commands is generated as a function of the command and of the at least one input, and
transmit each of the plurality of control commands to the corresponding electrical energy generating source, electrical energy storage device, or electrical load to manage energy transfer between the electrical energy generating source, the electrical energy storage device, and the electrical load; and
at least one knowledge system in communication with the controller, wherein the knowledge system transmits the at least one input to the controller.

16. The power control system of claim 15, wherein the knowledge system is selected from one of a weather service, an energy company, an energy market, and a remote monitoring facility.

17. The power control system of claim 15, further comprising a second electrical bus connected to the shared electrical bus, the second electrical bus including connected to the second electrical bus at least one of a second electrical energy generation source, a second electrical energy storage device, and a second electrical load; and
a second controller configured to generate a plurality of second control commands, wherein each of the plurality of second control commands corresponds to one of the second electrical energy generation source, the second electrical energy storage device, and the second electrical load, wherein the second controller is operable to execute a plurality of instructions stored in a second non-transitory memory to:
receive a second command corresponding to a desired operation of a second portion of the power control system,
receive at least one second input corresponding to one of a past operating state and a future operating state of the second portion of the power control system,
generate the plurality of second control commands as a function of the second command and of the at least one second input, and
transmit each of the plurality of second control commands to the corresponding second electrical energy generation source, second electrical energy storage device, and second electrical load to manage energy transfer therebetween, wherein the shared electrical bus is one of an AC bus and a DC bus, wherein the second electrical bus is one of an AC bus and a DC bus, and wherein each of the controllers is one of a local, cloud-based, or remote server.

18. A power control system for managing energy transfer, the power control system comprising:
a shared electrical bus including a first electrical energy generating source, a first electrical energy storage device, and a first electrical load each connected to the shared electrical bus;
a first controller operable to execute a plurality of instructions stored in a first non-transitory memory on the first controller to:
receive a first command corresponding to a desired operation of a first portion of the power control system,
receive at least one first input corresponding to one of a past operating state and a future operating state of the first portion of the power control system,
generate a plurality of first control commands, wherein each of the plurality of first control commands corresponds to one of the first electrical energy generating source, the first electrical energy storage device, and the first electrical load, and wherein each of the plurality of first control commands is generated as a function of the first command and of the at least one first input, and
transmit each of the plurality of first control commands to the corresponding first electrical energy generating source, first electrical energy storage device, or first electrical load to manage energy transfer between the first electrical energy generating source, the first electrical energy storage device, and the first electrical load; and at least one first sensor providing a signal to the first controller corresponding to one of a voltage, a current, and a level of energy transfer between the shared electrical bus and one of the first electrical energy generating source, the first electrical energy storage device, and the first electrical load, wherein the first controller further generates the plurality of first control commands as a function of the signal received from the at least one first sensor and wherein the first controller is further operable to generate a first log storing the present operating state for each of the first electrical energy generating source, the first electrical energy storage device, and the first electrical load over a predefined duration, and wherein the at least one first input corresponding to the past operating state of the power control system is the log;

a second electrical bus connected to the shared electrical bus, the second electrical bus including connected to the second electrical bus at least one of a second electrical energy generation source, a second electrical energy storage device, and a second electrical load connected to the second electrical bus; and a second controller configured to generate a plurality of second control commands, wherein each of the plurality of second control commands corresponds to one of the second electrical energy generation source, the second electrical energy storage device, and the second electrical load, wherein the second controller is operable to execute a plurality of instructions stored in a second non-transitory memory to:

receive a second command corresponding to a desired operation of a second portion of the power control system, receive at least one second input corresponding to one of a past operating state and a future operating state of the second portion of the power control system, generate the plurality of second control commands as a function of the second command and of the at least one second input, and transmit each of the plurality of second control commands to the corresponding second electrical energy generation source, second electrical energy storage device, and second electrical load to manage energy transfer therebetween; and at least one knowledge system in communication with the first or second controller, wherein the knowledge system transmits the at least one first input or the at least one second input to the first or second controller.

19. The power system of claim 18, further comprising a supervisory controller in communication with the first controller and the second controller, wherein the supervisory controller generates the first command and the second command, and wherein each of the controllers is one of a local, cloud-based, or remote server.

20. The power system of claim 19, wherein the supervisory controller is one of the first controller and the second controller.

* * * * *